United States Patent
Chen et al.

(10) Patent No.: US 7,051,134 B2
(45) Date of Patent: May 23, 2006

(54) DAISY CHAINED ATA HOST CONTROLLERS IN A SINGLE PCI DEVICE

(75) Inventors: Kuo-Kuang Chen, Taipei Hsien (TW); Li-Min Gu, Taipei Hsien (TW)

(73) Assignee: ALi Corporation (TW)

( * ) Notice: Subject to any disclaimer, the term of this patent is extended or adjusted under 35 U.S.C. 154(b) by 524 days.

(21) Appl. No.: 10/248,445

(22) Filed: Jan. 21, 2003

(65) Prior Publication Data
US 2004/0143694 A1    Jul. 22, 2004

(51) Int. Cl.
  *G06F 13/00*  (2006.01)
(52) U.S. Cl. .............. 710/113; 710/315; 710/74
(58) Field of Classification Search .......... 710/301, 710/107, 111, 113, 309, 315, 74; 711/112, 711/114
  See application file for complete search history.

(56) References Cited

U.S. PATENT DOCUMENTS

| | | | |
|---|---|---|---|
| 6,792,505 B1 * | 9/2004 | Otterness et al. | 711/114 |
| 6,854,045 B1 * | 2/2005 | Ooi et al. | 711/202 |
| 2004/0019709 A1 * | 1/2004 | Bissessur et al. | 710/14 |
| 2004/0083325 A1 * | 4/2004 | Rabinovitz et al. | 710/315 |
| 2004/0243386 A1 * | 12/2004 | Stolowitz et al. | 703/25 |

OTHER PUBLICATIONS

Serial ATA 2 Internal Ports, 1 Parallel ATA PCI Card product advertisement; URL: http://tekgems.com/Products/MJ-SATA-PCI-PRL.htm, undated, accessed Jun. 8, 2005.*
PCI Local Bus Specification (Revision 2.3 Oct. 31, 2001) Chapter 3 Bus Operation (p. 21-112) Chapter 6 Configuration Space (p. 193-225).

* cited by examiner

*Primary Examiner*—Glenn A. Auve
(74) *Attorney, Agent, or Firm*—Winston Hsu

(57) ABSTRACT

Implementing daisy chained ATA host controllers in a single PCI device. The present invention discloses a PCI card that includes a plurality of dominant chips, each of the dominant chips supporting at least one ATA host controller. The PCI card also includes a Flash memory for holding dominant chip settings, an arbiter to control and determine access between the dominant chips and the PCI local bus, and a plurality of ATA connectors corresponding to the ATA host controllers. Each dominant chip includes a byte of memory reserved as a mask to control access to an additional function that may be provided by the dominant chip.

20 Claims, 3 Drawing Sheets

US 7,051,134 B2

DAISY CHAINED ATA HOST CONTROLLERS IN A SINGLE PCI DEVICE

BACKGROUND OF INVENTION

1. Field of the Invention

The present invention relates to ATA host controllers on a PCI card. More specifically, a computer subsystem constructed by daisy chaining a plurality of dominant chips comprising ATA host controllers on a single PCI card is disclosed.

2. Description of the Prior Art

A peripheral component interconnect (PCI) card makes quick and easy expandability commonplace in modern computer systems. Designed by Intel and released in 1993, the PCI interface has long been incorporated into virtually all personal computers and provides a near universal platform for a plethora of variously functioning PCI cards.

Conventionally, a PCI card is designed to perform a specific function and comprises a dominant chip on the card that performs that function. For example, a PCI graphics card comprises a dominating graphics chip that does most of the work. The card itself basically provides an interface between the graphics chip and the rest of the computer system. Another example is a PCI card designed to operate a redundant array of inexpensive disks (RAID) system comprising two hard disk drives. This card would comprise a dominant chip comprising a host controller that operates the RAID system for the two disks.

Both the graphics chip and the chip that operates the RAID system have built in parameters limiting the workload of each chip. The graphics chip is only capable of producing so many triangles per second. The RAID chip is only capable of servicing two hard drives. If a system requires a function in excess of the limits provided by the dominant chip, such as servicing four hard drives, the common solution is to simultaneously utilize a second PCI card comprising the same dominant chip. Thus, two PCI graphics cards can increase the number of triangles processed per second and two PCI RAID cards can double the number of hard drives available for a given system.

The problem with this solution is that the number of PCI slots in a computer system is limited and a free PCI slot may not be available. Redesigning backplanes or motherboards comprising additional PCI slots is expensive. Furthermore, a design including additional PCI slots is considered an uncompetitive redundancy because each PCI slot is already capable of providing eight different functions. Because the conventional PCI card often utilizes only two or three of the eight possible functions, much of the capability of the PCI slot is wasted, reducing the motivation to provide additional PCI slots. Redesigning the dominant chip to higher functional limits, such as altering the RAID chip to control 4 disk drives, is another possible solution, but is difficult and usually economically unfeasible.

SUMMARY OF INVENTION

It is therefore a primary objective of the claimed invention to disclose a solution to the above-stated problems by utilizing a daisy chain architecture to allow multiple dominant chips on a single PCI card, thereby increasing the capabilities of the PCI card without requiring additional PCI slots or the expense of chip redesign.

Briefly summarized, the preferred embodiment of the claimed invention discloses a PCI card that includes a plurality of dominant chips connected together to form a daisy chain architecture, each of the dominant chips comprising at least one ATA host controller. The PCI card also includes a Flash ROM for holding dominant chip settings, an arbiter to control and determine access among the dominant chips and a PCI local bus, and a plurality of ATA connectors corresponding to the ATA host controllers. Each dominant chip includes a byte of memory reserved as a mask to control access to an additional function provided by the dominant chip.

It is an advantage of the claimed invention that using a plurality of dominant chips on a single PCI card increases the capabilities of the PCI card without requiring additional PCI slots or the expense of chip redesign and testing.

These and other objectives of the claimed invention will no doubt become obvious to those of ordinary skill in the art after reading the following detailed description of the preferred embodiment, which is illustrated in the various figures and drawings.

DETAILED DESCRIPTION

The Peripheral Component Interconnect (PCI) interface can support up to eight functions on one PCI card. The dominant chips on most conventional PCI cards utilize only a fraction of the eight functions available. The present invention discloses a new architecture that can daisy chain a plurality of dominant chips on a single PCI card while retaining single slot PCI compatibility and without any cost and effort to design a new, higher functioned dominant chip. A complete copy of the PCI specification Rev.2.3 can be obtained from the PCI Special Interest Group and is herein incorporated by reference.

Figure 1:
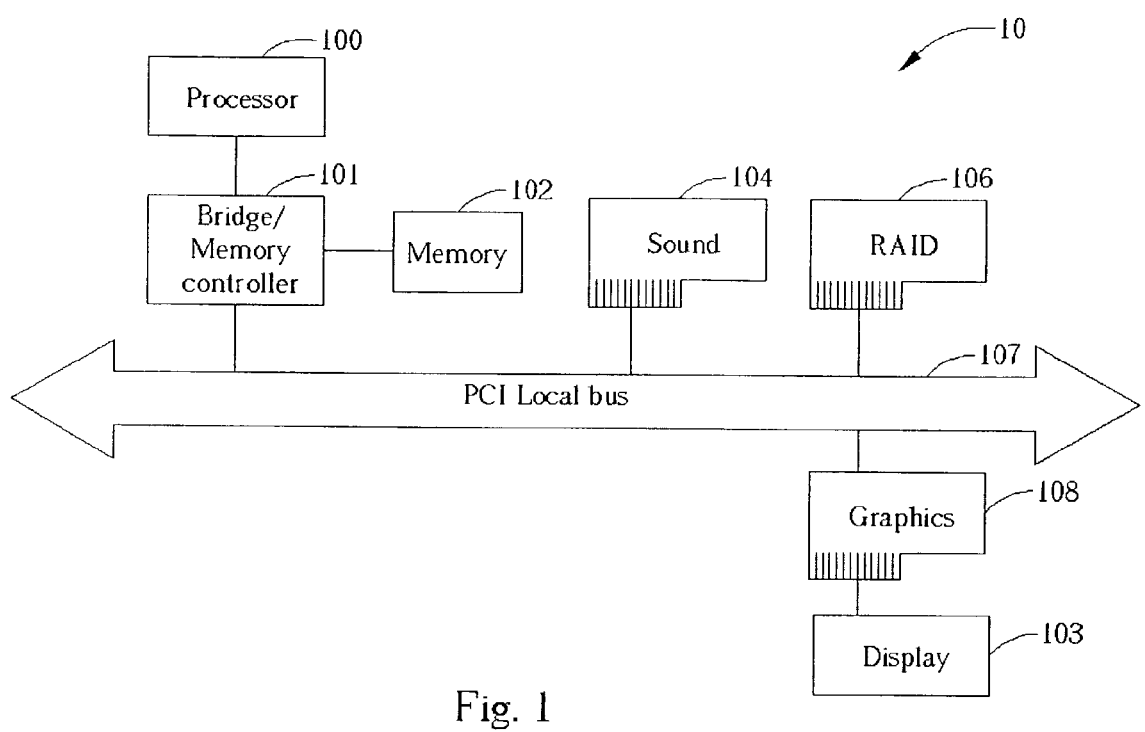
FIG. 1 is a block diagram of a computer system having a PCI local bus and PCI cards.

Please refer to FIG. 1 that shows a computer system 10 having a PCI local bus and 3 PCI cards. The computer system 10 comprises a processor 100, a processor-to-PCI bus bridge/memory controller 101, a memory 102, a display 103, a PCI sound card 104, a PCI graphics card 108, a PCI Redundant Array of Inexpensive Disks (RAID) card 106, and a PCI bus 107. The purpose of each pictured component is well known in the art and need not be dwelled upon here.

Although the disclosure of the present invention may be extended to PCI cards comprising dominant chips other than RAID controllers, a PCI card comprising the RAID controller will be used in this paper to best explain the teachings of the present invention. One example of the RAID controller is an M5281 chip manufactured by ALI Corporation. Details of the M5281 can be obtained from the manufacturer. The M5281 is selected as an example because it includes, among other features, 2 High Speed Serial Advanced Technology Attachment (SATA) host controllers and a Flash ROM controller for supporting Flash ROM. Thus, obviously a PCI card comprising a single M5281 can be used to control a 2-disk RAID. In this configuration, the PCI card only uses 3 of the 8 possible functions available to the card (1 function controls the Flash ROM, another controls the first disk, and a third controls the second disk). The present invention utilizes some or all of these unused available functions to expand the capabilities of the PCI card without the need or expense of redesigning of the dominant chip or providing an additional PCI slot.

Figure 3:
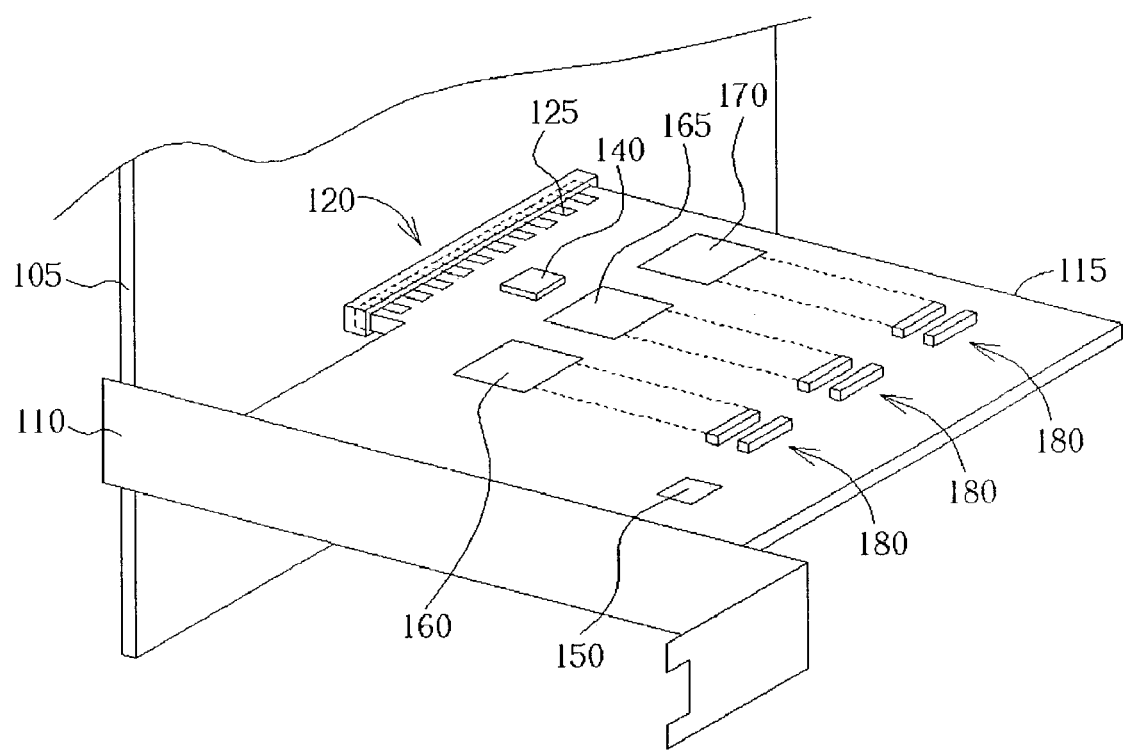
FIG. 3 is side-view diagram of the PCI card of FIG. 2.

Please refer to FIG. 3 that is a diagram of a PCI card 115 according to the present invention. The PCI card 115 attaches to the backplane or motherboard 105 of the computer system 10 by insertion of the PCI card 115 into the PCI slot 120. The bracket 110 at one end of the PCI card can be used to secure the PCI card 115 in place. Electrical connections between the components of the PCI card 115 and the motherboard 105 are made with a minimum of 45 pins 125.

The example of PCI card 115 shown in FIG. 3 comprises not only one, but a plurality of dominant chips 160, 165, 170, each capable of controlling a 2-disk RAID, 6 serial connectors 180, in which two serial connectors 180 are corresponding and connected to one of the dominant chips 160, 165, 170, a Flash ROM 150, and an arbiter 140.

To implement the daisy chaining of the three M5281 chips, a 2-bit hardware setting is required for each chip. A "00" indicates a single M5281 chip on the PCI card 115. A "01" indicates a first M5281 chip in the daisy chain. A "10" indicates a second M5281 chip in the daisy chain and a "11" indicates an optional third M5281 chip in the daisy chain. The single M5281 chip (not shown) or a first M5281 160 retains the ability to perform all 3 functions previously described. The second M5281 165 would only need to retain the two SATA host controllers and the Flash ROM controller in the second M5281 165 would be disabled. The $4^{th}$ and the $5^{th}$ functions provided by the PCI specification and available to the PCI card 115 would respectively map to the first and second SATA host controllers of the second M5281 165. Similarly, an optional third M5281 170 would only need to retain the two SATA host controllers with the Flash ROM controller in the third M5281 170 also being disabled. If a third M5281 170 is comprised on the PCI card 115, the $6^{th}$ and the $7^{th}$ functions provided by the PCI specification would respectively map to the first and second SATA host controllers of the third M5281 170.

Because the three dominant chips 160, 165, 170 on one PCI card 115 would be considered a single PCI device and the PCI specification supports four interrupt signals for one PCI device, a different interrupt vector is used for each M5281 160, 165, 170. For example, INTA# may be used for the first M5281 160, INTB# may be used for the second M5281 165, and INTC# may be used for the third M5281 170.

Because of the ATA's specification, each M5281 160, 165, 170 only supports an IO cycle when it is the target so there is no conflict with the PCI specification. All functions related to SATA and to PATA (a High Speed Parallel Advanced Technology Attachment also offered by the M5281) support Native mode IO. It is noteworthy that each M5281 160, 165, 170 is equipped with at least two SATA ports and at least twoPATA channels.

In the PCI master cycle, each PCI device, including the present invention's PCI card 115, occupies only one REQ#/GNT# (request/grant). To properly solve the problem of which dominant chip 160, 165, 170 is served, the system should do the REQ# wired AND. That is, the REQ# from the three dominant chips 160, 165, 170 are bundled into one REQ# and passed to the PCI arbiter. For the GNT#, the arbiter 140 on the PCI card 115 is required. One simple solution to the arbitration problem although other methods may be used equally as well, is with using a token passing method. As is well known in the art, a single token is passed between the dominant chips 160, 165, 170. A dominant chip 160, 165, 170 may access the PCI bus only when that specific dominant chip 160, 165, 170 has the token. The dominant chip 160, 165, 170 having the token will pass the token to another dominant chip 160, 165, 170 when releasing the bus.

Additionally, because the Flash ROM 150 comprises some whole chip software settings for the M5281s 160, 165, 170, to avoid the need of the Flash ROM 150 to occasionally allow read and write operations to or from the second M5281 165 or the third M5281 170 whose Flash ROM functions are disabled, one byte in each of the M5281s 160, 165, 170 is reserved as a mask. The mask indicates what can be written while the third function, that is, accessing the Flash ROM 150, is selected no matter which M5281 160, 165, 170 has the token. The mask can be written by software or firmware before the Flash ROM 150 operation occurs. When the mask matches the selected M5281 160, 165, 170, the selected Flash ROM controller can simply return the cycle or treat the cycle as not being a hit.

Figure 2:
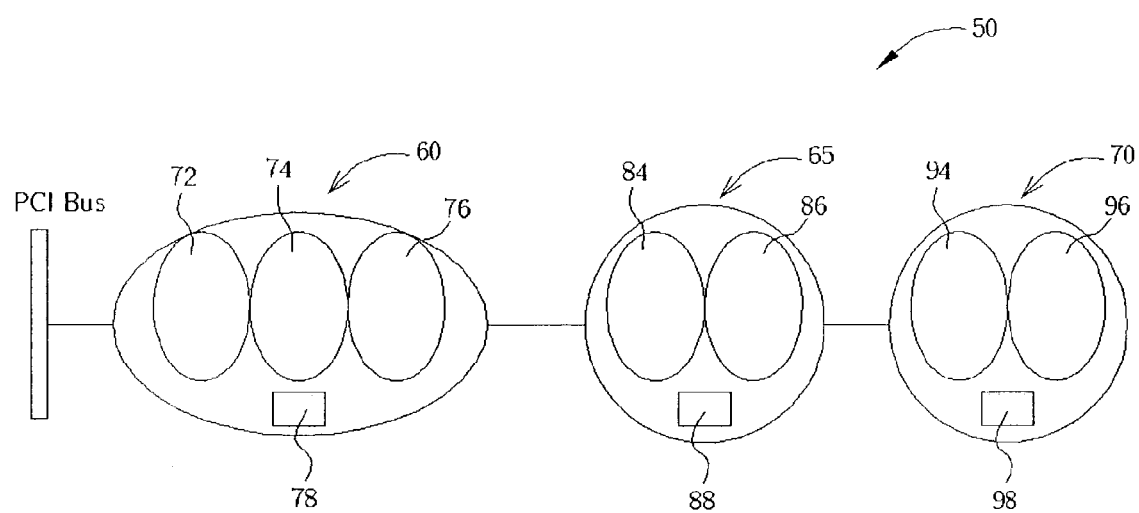
FIG. 2 is a diagram of a PCI card according to the present invention.

FIG. 2 is diagram of a PCI card 50 further illustrating the present invention. The PCI card 50 comprises a first dominant chip 60 that includes two SATA or PATA host controllers 72, 74, a Flash ROM controller 76, and a byte of memory 78 representing the mask byte. The second dominant chip 65 includes two SATA or PATA host controllers 84, 86 and a mask byte 88. The third dominant chip 70 also includes two SATA or PATA host controllers 94, 96 and a mask byte 98. To avoid redesign of the dominate chips 60, 65, 70, the second and third dominate chips 65, 70 may in reality each also include a Flash ROM controller, but as they is disabled, they are not shown in FIG. 2.

In contrast to the prior art, the present invention discloses a device and method for daisy chaining a plurality of dominant ATA host controller chips on a single PCI card. Daisy chaining existing ATA host controller chips on a single PCI card increases the capabilities of the PCI card without requiring additional PCI slots or the expense of chip redesign and testing.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A PCI card for a computer system comprising a PCI local bus, the PCI card comprising:
   a plurality of dominant chips connected together to form a daisy chain architecture, each of the dominant chips comprising at least one ATA host controller; and
   an arbiter for controlling access by each of the dominant chips to and from the PCI local bus;
   wherein the arbiter permits only one of the plurality of dominant chips to access the PCI local bus at a time.

2. The PCI card of claim 1 wherein the PCI card conforms to the PCI specification Rev.2.3 from the PCI Special Interest Group.

3. The PCI card of claim 2 further comprising at least one ATA connector electrically connecting to and corresponding to each dominant chip.

4. The PCI card of claim 3 further comprising a Flash ROM for holding dominant chip settings.

5. The PCI card of claim 4 wherein at least one of the ATA host controllers is a parallel ATA host controller.

6. The PCI card of claim 4 wherein at least one of the ATA host controllers is a serial ATA host controller.

7. The PCI card of claim 4 wherein each dominant chip comprises a byte of memory reserved for use as a mask to control access to an additional function provided by the dominant chip.

8. The PCI card of claim 7 wherein at least one dominant chip comprises two serial ATA ports and at least two parallel ATA channels.

9. The PCI card of claim 7 wherein the mask byte is used to permit or reject access to the Flash memory.

10. The PCI card of claim 7 wherein a 2-bit hardware setting indicates the position in the daisy chain architecture of each dominant chip.

11. The PCI card of claim 10 wherein each dominant chip is assigned a different interrupt vector.

12. The PCI card of claim 10 wherein the arbiter uses a token passing method to permit only one of the plurality of dominant chips to access the PCI local bus at a time.

13. A method for daisy chaining a plurality of dominant chips on a single PCI card, each dominant chip comprising at least one ATA host controller, the method comprises:
   providing hardware settings to indicate daisy chain positions of each dominant chip; and
   providing an arbiter for controlling access by each of the dominant chips to and from a PCI local bus.

14. The method of claim 13 wherein the arbiter permits only one of the plurality of dominant chips to access the PCI local bus at a time.

15. The method of claim 14 wherein the arbiter uses a token passing method to permit only one of the plurality of dominant chips to access the PCI local bus at a time.

16. The method of claim 14 further comprises providing a separate interrupt vector for each dominant chip.

17. The method of claim 14 wherein at least one of the ATA host controllers is a serial ATA host controller.

18. The method of claim 14 wherein at least one of the ATA host controllers is a parallel ATA host controller.

19. The method of claim 14 further comprises using a Flash memory comprised on the PCI card to hold dominant chip settings and each dominant chip comprises a byte of memory to be utilized as a mask for accepting or rejecting access to the Flash ROM.

20. The method of claim 14 further comprises the PCI card conforming to the PCI specification Rev.2.3 from the PCI Special Interest Group.

* * * * *

UNITED STATES PATENT AND TRADEMARK OFFICE
CERTIFICATE OF CORRECTION

| | | |
|---|---|---|
| PATENT NO. | : 7,051,134 B2 | Page 1 of 1 |
| APPLICATION NO. | : 10/248445 | |
| DATED | : May 23, 2006 | |
| INVENTOR(S) | : Kuo-Kuang Chen et al. | |

It is certified that error appears in the above-identified patent and that said Letters Patent is hereby corrected as shown below:

Title page 73 Assignee

Insert address

ALI CORPORATION
        21F, NO. 88, SEC. 1, HSIN-TAI-WU RD.
        HSI-CHIH CITY
        TAIPEI HSIEN, TAIWAN

Signed and Sealed this

Nineteenth Day of February, 2008

JON W. DUDAS
*Director of the United States Patent and Trademark Office*